United States Patent
Bornoff et al.

(10) Patent No.: US 9,928,317 B2
(45) Date of Patent: Mar. 27, 2018

(54) ADDITIVE DESIGN OF HEAT SINKS

(71) Applicant: Mentor Graphics Corporation, Wilsonville, OR (US)

(72) Inventors: Robin Bornoff, Herefordshire (GB); John Parry, Surrey (GB)

(73) Assignee: Mentor Graphics Corporation, Wilsonville, OR (US)

( * ) Notice: Subject to any disclaimer, the term of this patent is extended or adjusted under 35 U.S.C. 154(b) by 358 days.

(21) Appl. No.: 14/824,370

(22) Filed: Aug. 12, 2015

(65) Prior Publication Data

US 2016/0224699 A1  Aug. 4, 2016

Related U.S. Application Data

(60) Provisional application No. 62/110,787, filed on Feb. 2, 2015.

(51) Int. Cl.
*G06F 17/50* (2006.01)
*G06F 1/20* (2006.01)

(52) U.S. Cl.
CPC ............ *G06F 17/5009* (2013.01); *G06F 1/20* (2013.01); *G06F 2217/16* (2013.01); *G06F 2217/80* (2013.01)

(58) Field of Classification Search
CPC ........ G06F 17/5009; F04B 19/06; F28F 3/02; H01L 23/367; H01L 23/373; H01L 23/3677; H01L 24/25; H01L 51/5203; H05K 7/432
See application file for complete search history.

(56) References Cited

U.S. PATENT DOCUMENTS

| 7,472,363 | B1* | 12/2008 | Chandra | G06F 17/5009 716/106 |
| 8,650,521 | B1 | 2/2014 | Ordonez Ruiz et al. | |
| 8,674,470 | B1* | 3/2014 | Or-Bach | H01L 24/25 257/499 |
| 2003/0062149 | A1* | 4/2003 | Goodson | F04B 19/006 165/104.11 |
| 2010/0007013 | A1* | 1/2010 | Kuroda | H01L 23/367 257/712 |
| 2012/0234524 | A1* | 9/2012 | Fan | H01L 23/373 165/185 |

(Continued)

OTHER PUBLICATIONS

Stinnett, W.A., "Thermal management of power electronic building blocks", Vitginia Polytecnic Institute, 19999.*

(Continued)

*Primary Examiner* — Kandasamy Thangavelu

(57) ABSTRACT

Techniques for employing an additive design process to design heat sinks are disclosed. A heat sink "grows" through an iteration process. During each iteration step, an object is added to a location determined based on simulation. The criterion for the determination may be being a location having a highest fluid apparent surface temperature value or being a location having a highest bottleneck heat transfer characteristic value. The thermal performance of the newly derived structure is simulated. If a predetermined condition is met, the object is kept. Otherwise, the object is removed and the location is marked so that the same addition may not occur subsequently. The iteration process may be repeated.

20 Claims, 9 Drawing Sheets

(56) References Cited

U.S. PATENT DOCUMENTS

| | | | | |
|---|---|---|---|---|
| 2014/0014308 A1* | 1/2014 | Wu | ............................ | F28F 3/02 |
| | | | | 165/185 |
| 2015/0123241 A1* | 5/2015 | Yan | ...................... | H01L 23/3677 |
| | | | | 257/506 |
| 2015/0173248 A1* | 6/2015 | Zeng | ..................... | H05K 7/1432 |
| | | | | 361/709 |
| 2015/0334804 A1* | 11/2015 | Yan | ...................... | H01L 51/5203 |
| | | | | 315/112 |
| 2017/0091356 A1* | 3/2017 | Bornoff | ................ | G06F 17/5009 |

OTHER PUBLICATIONS

Pang et al., "Thermal design and optimization methodology for integrated power electronic modules" ASME 2005.*

Biela et al., "Towards virtual prototyping and comprehensive multi-objective optimization in power electronics", 2010.*

* cited by examiner

ADDITIVE DESIGN OF HEAT SINKS

RELATED APPLICATIONS

This application claims the benefit of U.S. Provisional Patent Application No. 62/110,787, filed on Feb. 2, 2015, and naming Robin Bornoff et al. as inventors, which application is incorporated entirely herein by reference.

FIELD OF THE DISCLOSED TECHNOLOGY

The present disclosed technology is directed to heat sink design. Various aspects of the disclosed technology may be particularly useful for applying an additive design process to heat sink design.

BACKGROUND OF THE DISCLOSED TECHNOLOGY

Adrian Bejan proposed the constructal law, stating: "For a finite-size system to persist in time (to live), it must evolve in such a way that it provides easier access to the imposed currents that flow through it". Such a law can be said to underpin the formation of many systems both animate and inanimate, including, but not limited to, the branching nature of lightning, rivers, lungs and trees.

Various studies based on the constructal law have focused on 'volume to point' (VP) flow systems: thermal conduction of heat (A. Bejan, "Constructal-Theory Network of Conducting Paths for Cooling a Heat Generating Volume", International Journal of Heat and Mass Transfer, Vol. 40, No. 4, pp. 799-816, 1997), liquid flow in a porous media (M. R. Errera et al., "Deterministic Tree Networks for River Drainage Basin", Fractals, Vol. 6, No. 3, pp. 245-261, 1998), and air flow in lungs (A. H. Reis et al., "Constructal theory of flow architecture of the lungs", Medical Physics Vol 31 No. 5, pp. 1135-1140, 2004).

Boichot et al described in "Tree-network structure generation for heat conduction by cellular automaton", Energy Conversion and Management, Vol. 50 no. 2, pp. 376-386, 2009, an approach to the thermal conduction VP problem where a domain was discretized into cellular automata elements. The cellular automota elements were allowed to change between high and low thermal conductivity based on a certain thermal condition during an iterative process. A dendritic branched high conductivity material topology was seen to emerge as the process converged.

Marck et al described in "Evolutionary structural optimization by extension to cool a finite-size volume generating heat", 2011, 7th International Conference on Computational Heat and Mass Transfer, No. 152, Istanbul (Turkey), an Evolutionary Structural Optimisation approach to the VP problem. The high conductivity topology, made up of abutting automota, evolved via addition during an iterative process based on multiple objective functions. More recent work described by Marck et al in "conductive and convective heat transfers", OPT-i 2014, International Conference on Engineering and Applied Sciences Optimization, Kos Island (Greece), has started to consider convective effects as well.

Established heat sink manufacturing processes such as extrusion and casting impose constraints on the methods used to design heat sinks These constraints limit both allowable geometry topologies and absolute sizes. The advent of 3D printing (additive manufacture) may remove many of these constraints, enabling practical applications of the constructal law to heat sink design. Heat sinks growing through an additive design process may exhibit a superior thermal performance.

BRIEF SUMMARY OF THE DISCLOSED TECHNOLOGY

Aspects of the disclosed technology relate to techniques of employing an additive design process to design heat sinks In one aspect, there is a method comprising: A: determining a location on a heat sink base based on a simulation of a structure in a cooling environment and a predetermined criterion, the structure comprising the heat sink base and a heat source; B: adding an object to the location to form a new structure; C: simulating the new structure to determine thermal performance of the new structure; and D: repeating operations B and C until a predetermined condition regarding design space is met, wherein the repeating comprises: if the thermal performance of the new structure meets a predetermined condition regarding thermal performance, replacing the location with a new location determined for the new structure based on the simulating and the predetermined criterion for operation B; and if the thermal performance of the new structure does not meet the predetermined condition regarding thermal performance, removing the added object, designating the location as a location not eligible for the adding, and replacing the location with a new location for the structure selected from locations eligible for the adding based on the predetermined criterion for operation B.

The method may further comprise changing the locations not eligible for the adding to locations eligible for the adding; and repeating operations A, B, C and D by using the new structure derived after the predetermined condition regarding design space is met as the heat sink base.

The method may further still comprise smoothing edges of the new structure derived after the predetermined condition regarding design space is met.

The predetermined criterion may be being a location having a highest fluid apparent surface temperature value, being a location having a highest bottleneck heat transfer characteristic value, or being a location having a highest shortcut heat transfer characteristic value.

The thermal performance may be represented by thermal resistance and the predetermined condition regarding thermal performance may be improvement in thermal resistance is above a percentage value.

The predetermined condition regarding design space is there is no location eligible for the adding left in the design space.

In another aspect, there are one or more computer-readable media storing computer-executable instructions for causing one or more processors to perform the above method.

In still another method, there is a system, comprising: one or more processors, the one or more processors programmed to perform the above method.

These and other features of the disclosed technology will be described in more detail below.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

Figure 1:
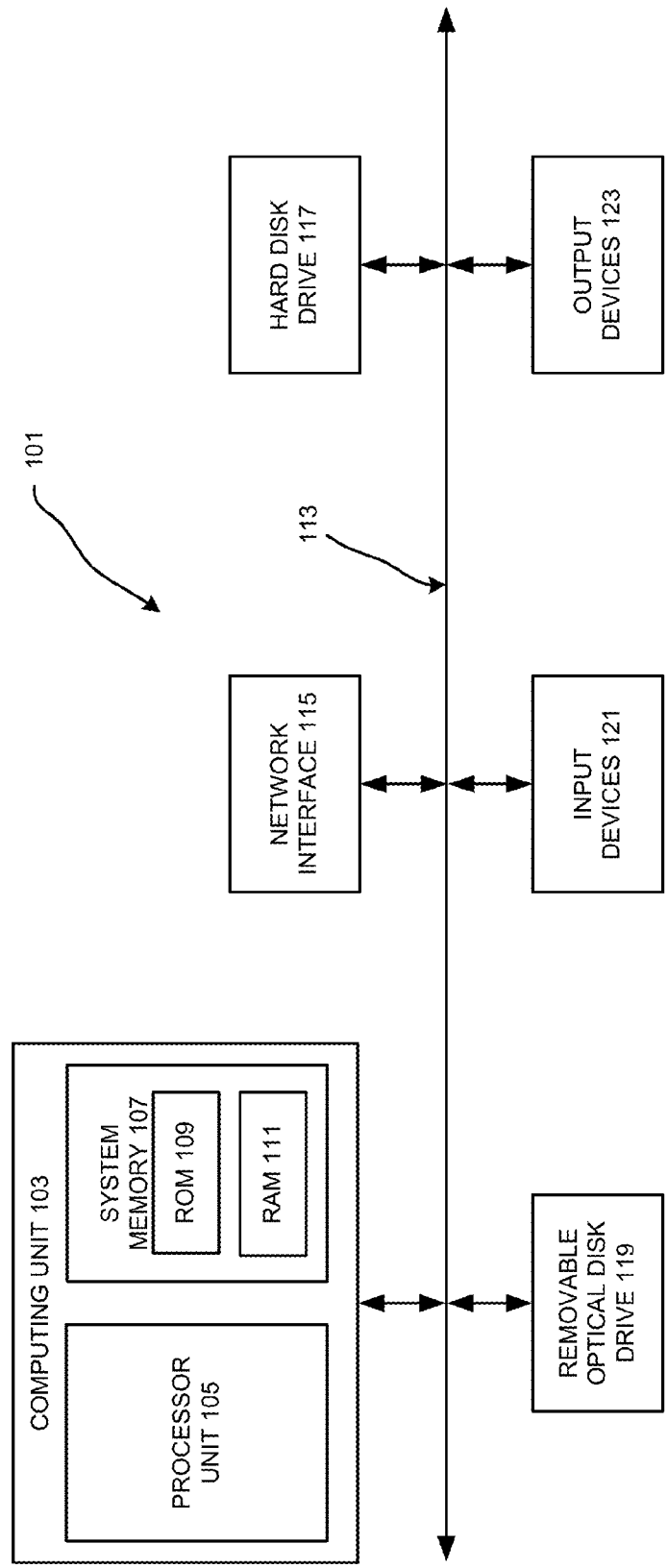
FIG. 1 illustrates an example of a programmable computer that may be used to implement a heat sink design tool or method according to various embodiments of the disclosed technology.

Aspects of the disclosed technology relate to techniques of employing an additive design process to design heat sinks In the following description, numerous details are set forth for purpose of explanation. However, one of ordinary skill in the art will realize that the disclosed technology may be practiced without the use of these specific details. In other instances, well-known features have not been described in detail to avoid obscuring the present disclosed technology.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "add," "simulate" and "determine" to describe the disclosed methods. These terms are high-level abstractions of the actual operations that are performed. The actual operations that correspond to these terms may vary depending on the particular implementation and are readily discernible by one of ordinary skill in the art.

Any of the disclosed techniques can be implemented in whole or in part by software comprising computer-executable instructions stored on computer-readable media. Such software can comprise, for example, an appropriate electronic design automation ("EDA") software tool. Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language.

Any data produced from any of the disclosed methods can be stored on computer-readable media (e.g., tangible computer-readable media, such as one or more CDs, volatile memory components (such as DRAM or SRAM), or non-volatile memory components (such as hard drives)) using a variety of different data structures or formats. Such data can be created, updated, or stored using a local computer or over a network (e.g., by a server computer).

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked, and includes both direct connections or direct links and indirect connections or indirect links through one or more intermediate elements not affecting the intended operation of the circuit.

Exemplary Operating Environment

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard"

magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multiprocessor computer, a plurality of single and/or multiprocessor computers arranged into a network, or some combination of both.

Heat Sink Design Tool

Figure 2:
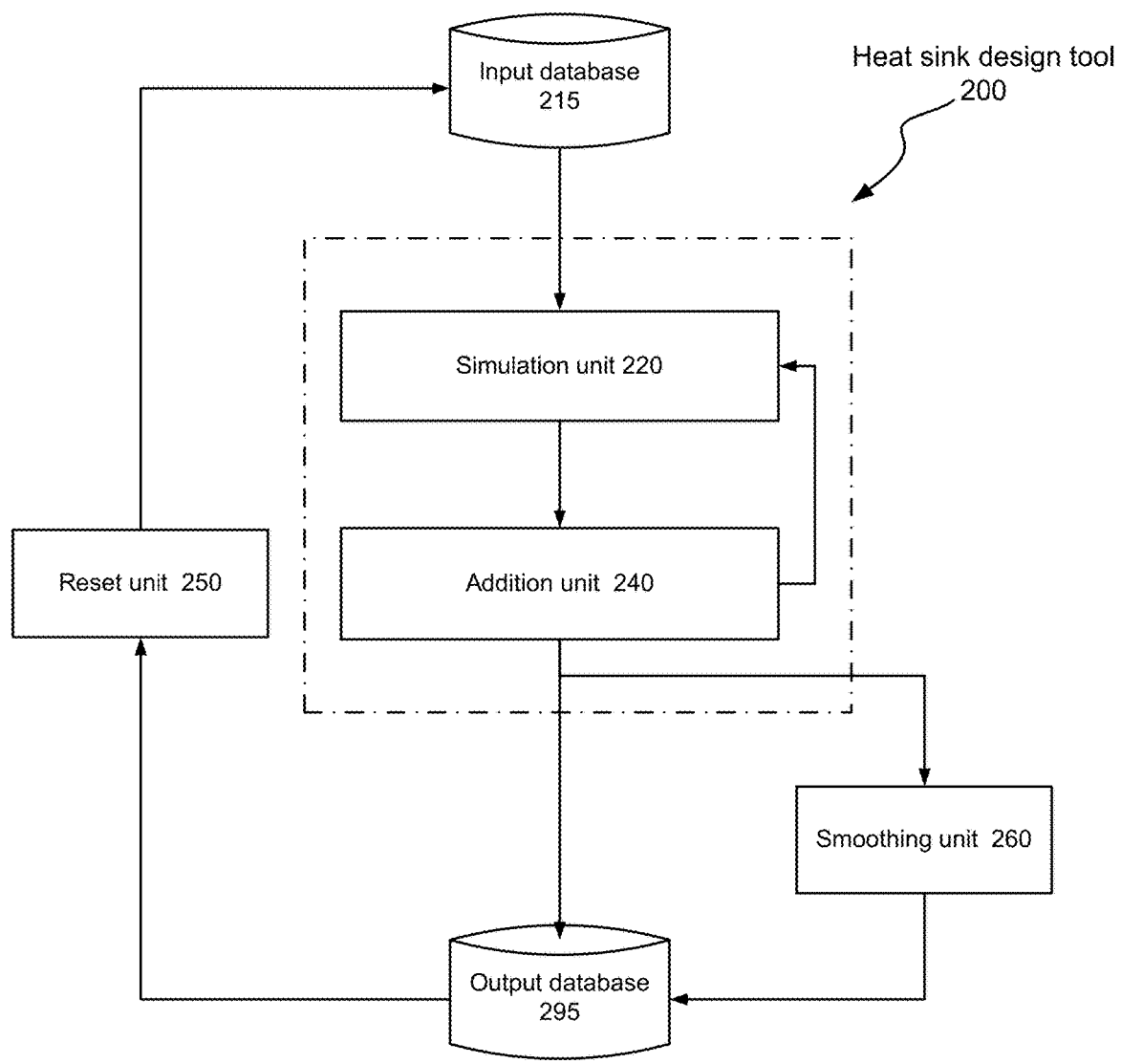
FIG. 2 illustrates a heat sink design tool according to various embodiments of the disclosed technology.

FIG. 2 illustrates an example of a heat sink design tool 200 that may be provided according to various embodiments of the disclosed technology. As seen in this figure, the heat sink design tool 200 includes a simulation unit 220 and an addition unit 240. Some implementations of the heat sink design tool 200 may optionally include one or both of a reset unit 250 and a smoothing unit 260. As will be discussed in more detail below, some implementations of the heat sink design tool 200 may be employed with an input database 215, an output database 295, or both.

With some embodiments of the disclosed technology, one or more of the simulation unit 220, the addition unit 240, the reset unit 250 and the smoothing unit 260 may be implemented by one or more programmable computers, such as the computer 101 shown in FIG. 1, executing programming instructions. Correspondingly, alternate embodiments of the disclosed technology may be implemented by software instructions for programming a programmable computer to perform the functions of one or more of the units 220-260 stored on a non-transitory computer-readable medium. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

As will be discussed in more detail below, the simulation unit 220 is configured to simulate a structure in a cooling environment. Various implementations of the disclosed technology may use conventional thermal modeling software for the simulation. For example, various examples of the disclosed technology may install the FloTHERM® family of software products available from Mentor Graphics Corporation of Wilsonville, Oreg., or the ANSYS® Icepak® software product available from Ansys, Inc., of Canonsburg, Pa., in a computer to implement the simulation unit 220.

Based on the simulation, the simulation unit 220 can also determine a location of the structure for adding an object according to a predetermined criterion and thermal performance of the structure. Two examples of the predetermined criterion that may be employed are being a location of highest temperature and being a location of thermal bottleneck. The addition unit 240 is configured to add an object to the location. The simulation unit 220 and the addition unit 240 work together in sequence to execute an additive design process.

In some embodiments of the disclosed technology, the reset unit 250 is configured to change locations designated as ineligible for the addition during the additive design process to be eligible locations. This allows the heat sink design tool 200 to run multiple heat sink growth processes. The smoothing unit 260 may be employed to smooth edges of the generated heat sink.

With various examples of the disclosed technology, the input database 215 and the output database 295 may be implemented using any suitable computer readable storage device. That is, either of the input database 215 and the output database 295 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, punched media, holographic storage devices, or any other non-transitory storage medium that can be used to store desired information. While the input database 215 and the output database 295 are shown as separate units in FIG. 2, a single data storage medium may be used to implement some or all of these databases.

Heat Sink Additive Design

Figure 3:
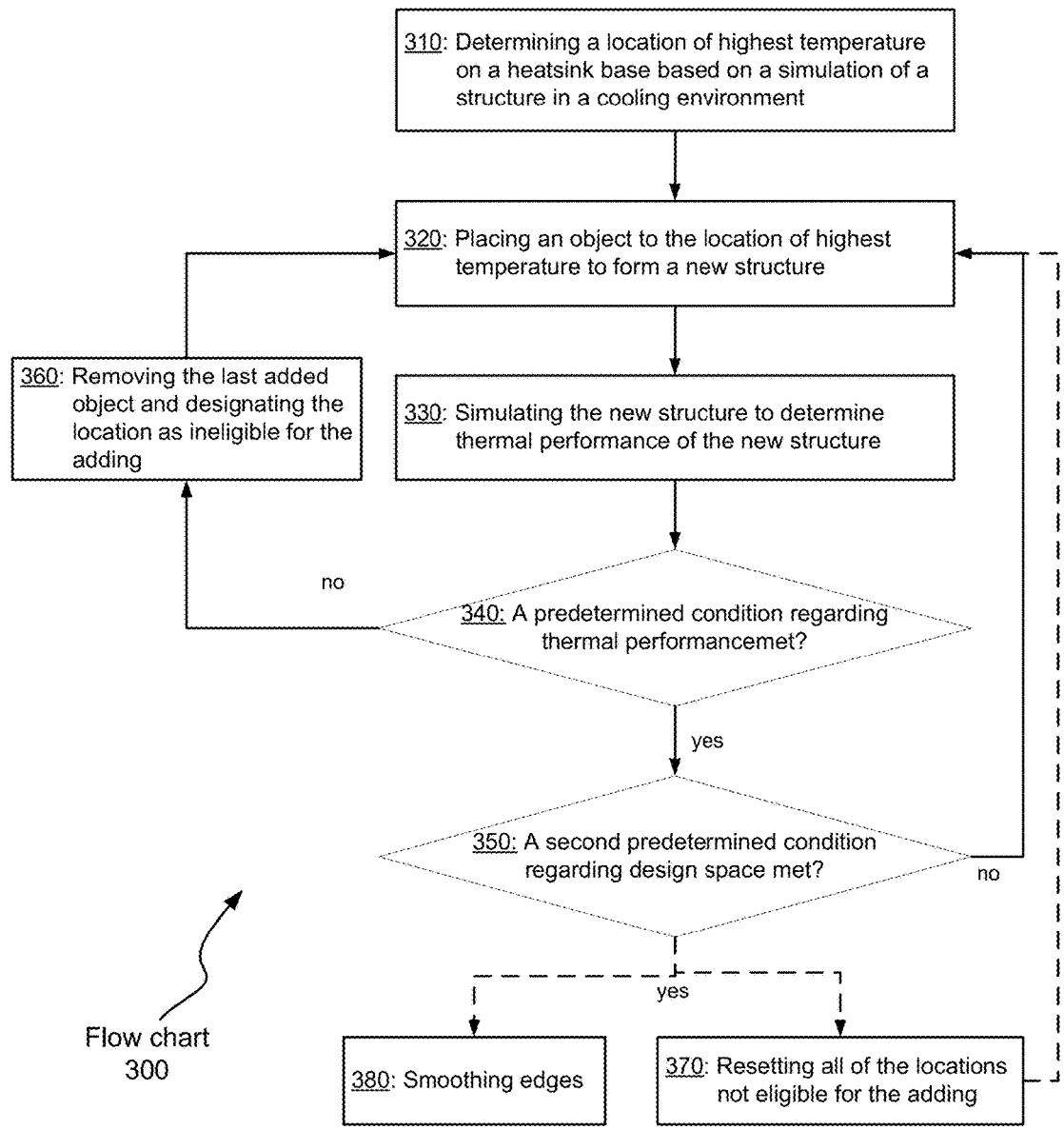
FIG. 3 illustrates a flowchart showing methods of employing an additive design process to design heat sinks according to various embodiments of the disclosed technology.

FIG. 3 illustrates additive design of heat sinks methods that may be employed according to various embodiments of the disclosed technology. For ease of understanding, these methods will be described with reference to the heat sink design tool 200 illustrated in FIG. 2. It should be appreciated, however, that alternate implementations of a heat sink design tool may be used to perform the additive design of heat sinks methods shown in FIGS. 3. Likewise, the heat sink design tool 200 may be employed to perform other additive design of heat sinks methods according to various embodiments of the disclosed technology.

Figure 4A:
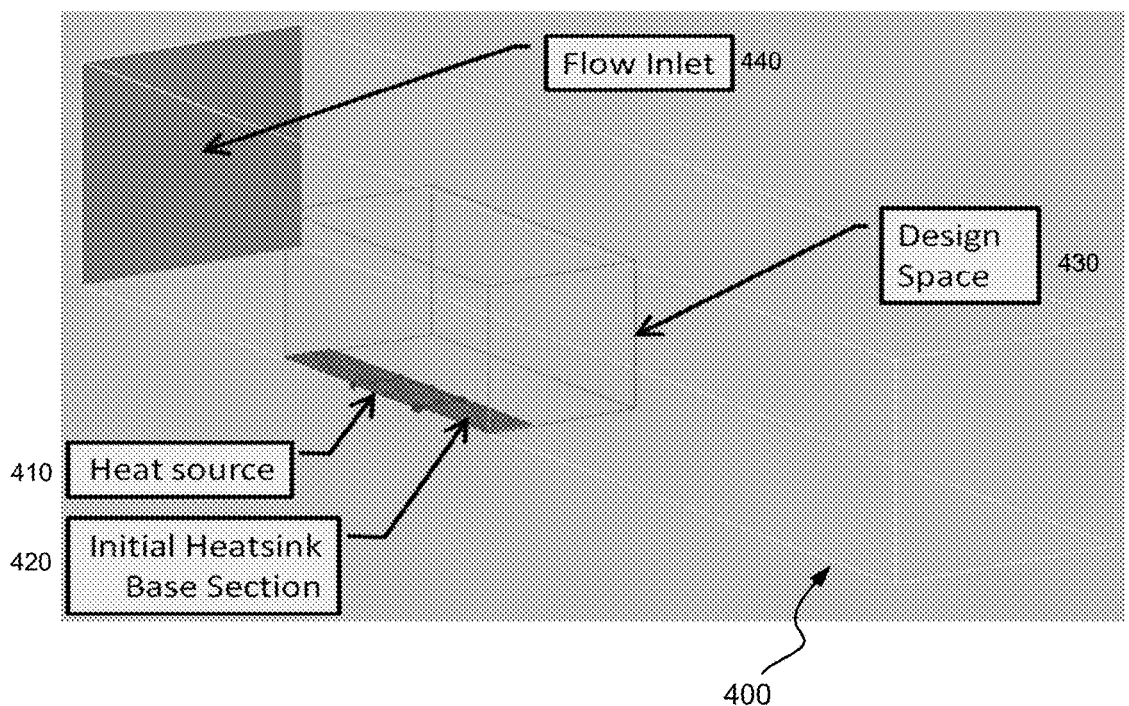
FIG. 4A illustrates an example of a structure and its environment before an additive design.
Figure 4B:
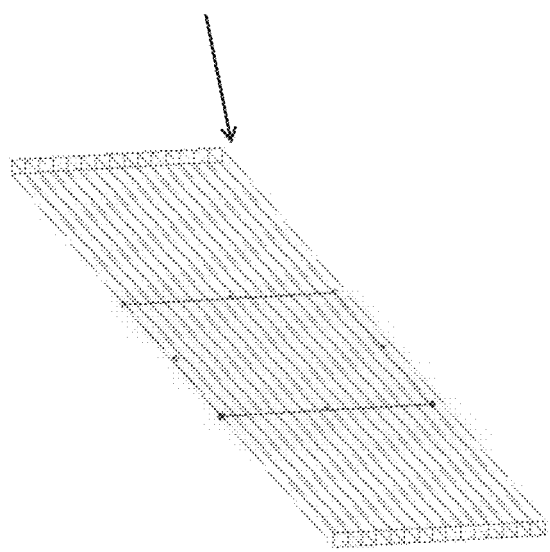
FIG. 4B illustrates a zoom-in view of the heat sink base and the heat source shown in FIG. 4A.

Initially, in operation 310, the simulation unit 220 performs a simulation of a structure in a cooling environment and determines a location of the structure based on a predetermined criterion. The structure being simulated comprises a heat sink base and a heat source. The location is on the heat sink base. FIG. 4A illustrates an example of such a structure. In this example, a heat sink base 420 and a heat source 410 are both rectangles in shape, but have different sizes. The structure sits in a forced convection wind channel 400 and is enclosed by a design space 430. The flow inlet 440 is located at the left side of the wind channel 440. The heat sink base 420 fills the design space 430 in the flow direction (from left to right). Due to geometric symmetry, only half of the structure is shown. FIG. 4B illustrates a zoom-in view of the heat sink base 420 and the heat source 410.

One example for the predetermined criterion is being a location having a highest surface temperature value. As noted previously, a conventional thermal modeling software may be employed by the simulation unit 220 to compute fluid apparent surface temperature and determine a location having the maximum fluid apparent surface temperature. An improvement in the thermal performance of the heat sink can be achieved by increasing the surface area at the point of highest temperature Another example of the predetermined criterion is being a location having a highest bottleneck heat transfer characteristic value or a highest shortcut heat transfer characteristic value. Relatively higher bottleneck heat transfer characteristic values indicate regions of a structure where heat flow is more restricted than other regions of the structure regions (i.e., regions or paths having a significant amount of heat flow but experiencing higher thermal resistance to that heat flow than other regions or paths). Relatively higher shortcut heat transfer characteristic values indicate regions of a structure where additional heat conduction will improve overall heat flow. Methods for determining bottleneck heat transfer characteristic values and highest shortcut heat transfer characteristic values have been disclosed in U.S. Pat. No. 8,628,236, entitled "Thermal analysis", which is incorporated herein by reference. Adding an object to the location of largest thermal bottleneck parameter or the location of largest thermal shortcut parameter may lead to a significant reduction in thermal resistance.

Next, in operation 320, the addition unit 240 adds an object to the location determined in the operation 310 to form a new structure. The object can be any shape. In the example shown in FIG. 4A, a rod with a square cross section and having the same length as the heat sink base 420 in the flow direction may be used. Using such a simpler regular object makes the simulation quicker. More complex objects may generate a heat sink with better thermal performance.

Next, in operation 330, the simulation unit 220 simulates the new structure to determine thermal performance of the new structure. The thermal performance may be represented by thermal resistance. With various implementations of the disclosed technology, the thermal resistance may be derived from the temperature of the heat sink base at the center of the heat source, the power dissipation and the ambient cooling temperature. One equation for the thermal resistance $R_{th}$ is:

$$R_{th}(\text{DegC/W}) = (T_b - T_a)/P$$

where $T_b$ is the heat sink base temperature (above center of heat source), $T_a$ is ambient temperature, and P is dissipated power.

In operation 340, the heat sink design tool 200 determines whether a predetermined condition regarding thermal performance is met based on the thermal performance of the new structure. If the predetermined condition regarding thermal performance is met, the operations 310 and 320 are repeated. The location for object addition will be changed to a new location determined based on the simulation of the new structure. If the predetermined condition regarding thermal performance is not met, the added object is removed and the location is designated as a location not eligible for object addition in operation 360. Then, the operations 310 and 320 are repeated by replacing the location with a new location for the structure selected from locations eligible for the unit object based on the previous simulation of the structure.

The predetermined condition regarding thermal performance may be simply set as whether the thermal performance improves with the addition of the unit object. This condition may grow the heat sink too fast to allow an intuitively desired branching structure to dominate the topology. Another condition may be employed is a predetermined percentage value of thermal performance improvement. The percentage value may be set dynamically during the iterative process.

In operation 350, the heat sink design tool 200 determines whether a predetermined condition regarding design space is met. The iterative process ends when either the addition of any geometry will cause the heat sink to 'grow' beyond its design bounds or that the addition of a unit object anywhere will not cause any improvement or improvement above a certain percentage in thermal performance.

Like the percentage value used for the predetermined condition regarding thermal performance, the object to be added in the 340 operation may be changed dynamically during the iterative process.

The above additive design process may be treated as one growth stage. The derived heat sink may serve as a starting point for another growth stage. In operation 370, for example, the reset unit 250 resets all of the locations not eligible for the adding designated in the previous stage and then the operations 320-360 are repeated.

The use of a square section rod as the object to grow a heat sink may result in any angled or curved topological features with stair-stepped edges. Although this might increase heat transfer, it may be offset by the increase in surface friction. A smoothing operation may therefore be performed. In operation 380, the smoothing unit 260 smooth removes edges of the heat sink design. In some embodiments of the disclosed technology, this may be done manually using a standard 'chamfering' MCAD function, chamfer angle is set to 45 degree and chamfer thickness to 1 mm. Stair stepped edges are then manually chamfered.

Figure 5:
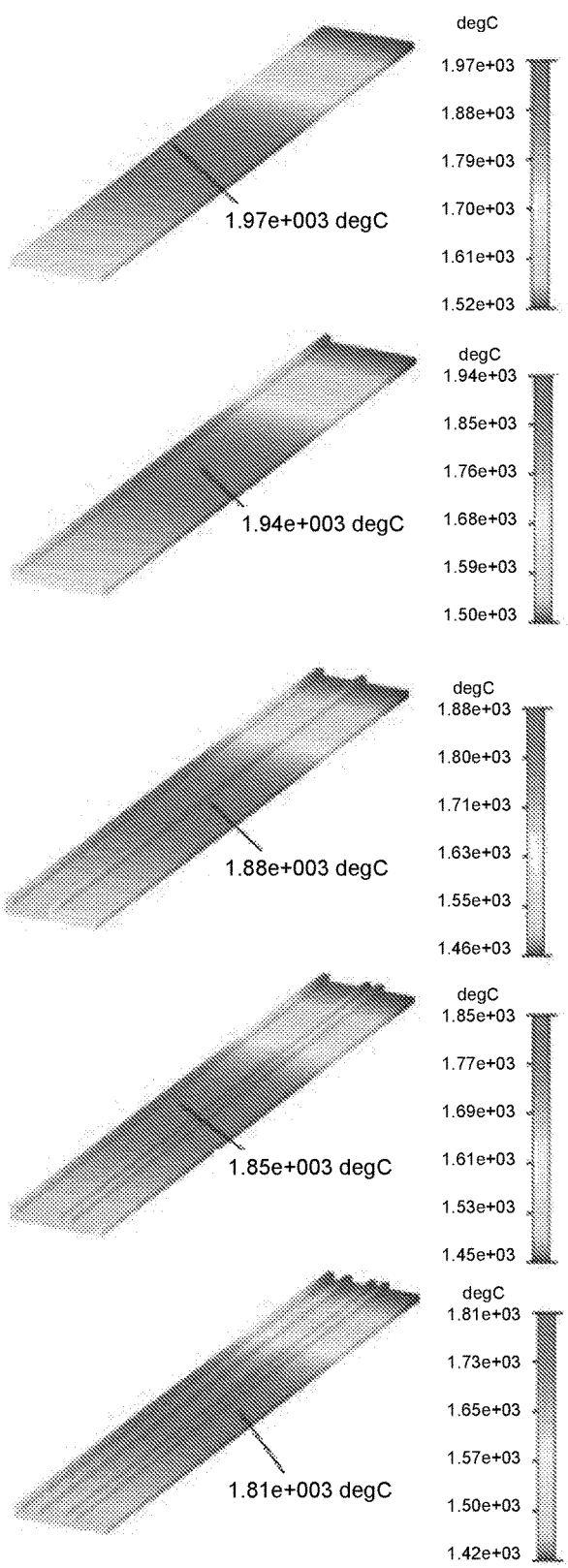
FIG. 5 illustrates the first five iterations of an additive design process according to various embodiments of the disclosed technology.

FIG. 5 illustrates the first five iterations of the additive design process for the example shown in FIGS. 4A and 4B. Geometric symmetry is utilized so that only half of the computational domain need be modelled. The inlet air speed is set as 3 m/s (590.5 LFM). Appropriate for such forced convection environments, buoyancy and radiative heat loss are not accounted for, but this is not a limitation of the method. The inlet temperature is set to 0 degree C. and the heat source to 200 W. With no temperature dependence of any other boundary condition, these are just arbitrary scalars. The maximum surface temperature value and location is annotated. Note the addition of the rod along length of the initial base section, covering the point of highest surface temperature. For these initial stages, the temperature levels are very high but decrease substantially with each addition of surface area.

Figure 6:
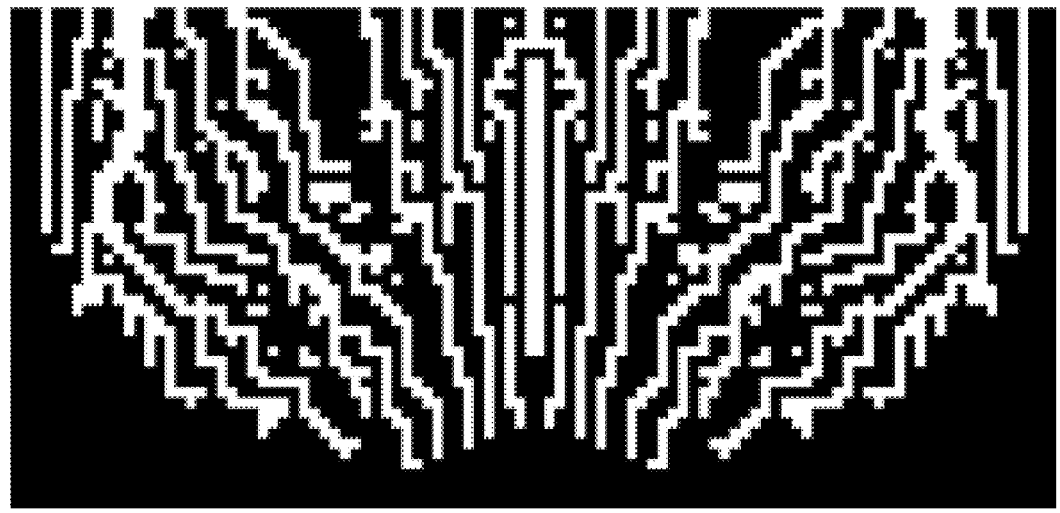
FIG. 6 illustrates a heat sink cross sectional profile generated based on setting the predetermined condition regarding thermal performance as whether the thermal performance improves with the addition of the unit object.
Figure 7:
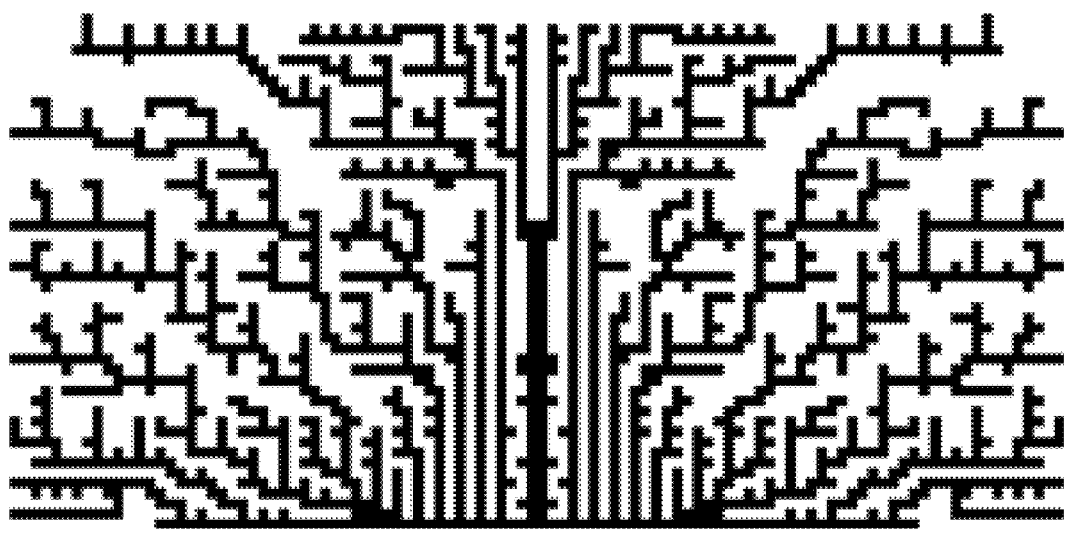
FIG. 7 illustrates a heat sink cross sectional profile generated based on setting the predetermined condition regarding thermal performance as above a predetermined percentage value of thermal performance improvement (at least 25% of the average improvement in this case).

The heat sink grows via the addition of rods to fill the design space. The extruded nature of the rod geometry results in an extruded heat sink cross sectional profile. FIGS. 6 and 7 illustrate heat sink cross sectional profiles generated based on setting the predetermined condition regarding thermal performance as whether the thermal performance improves with the addition of the unit object and as above a predetermined percentage value of thermal performance improvement (at least 25% of the average improvement in this case), respectively. The growth in the latter case extends to the edges of the design space. Where 'branches' are seen to terminate within the design space, addition of a rod to extend them did not meet the thermal resistance % decrease condition.

Figure 8:
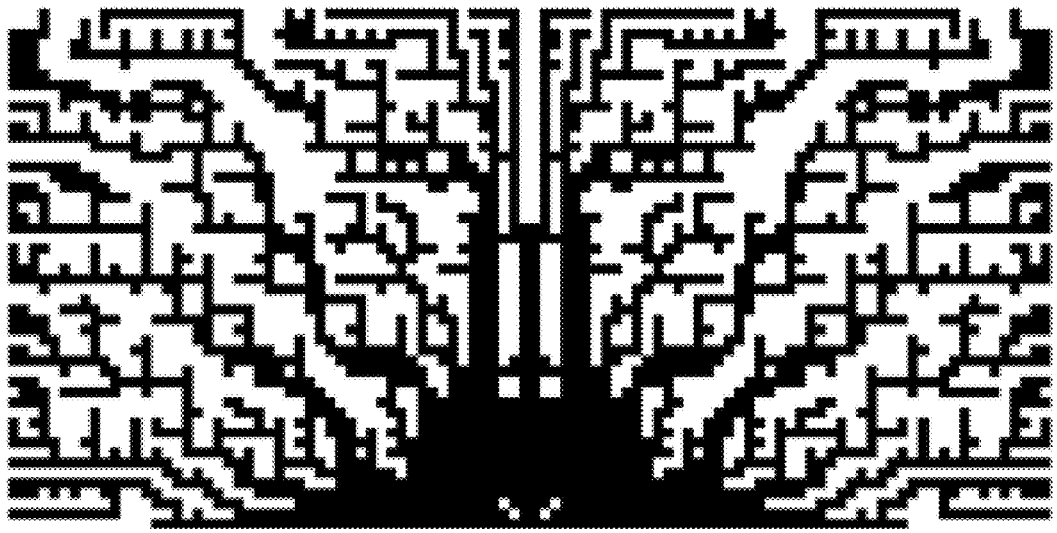
FIG. 8 illustrates a result of a second growth stage that uses the structure shown in FIG. 7 as a starting point.
Figure 9:
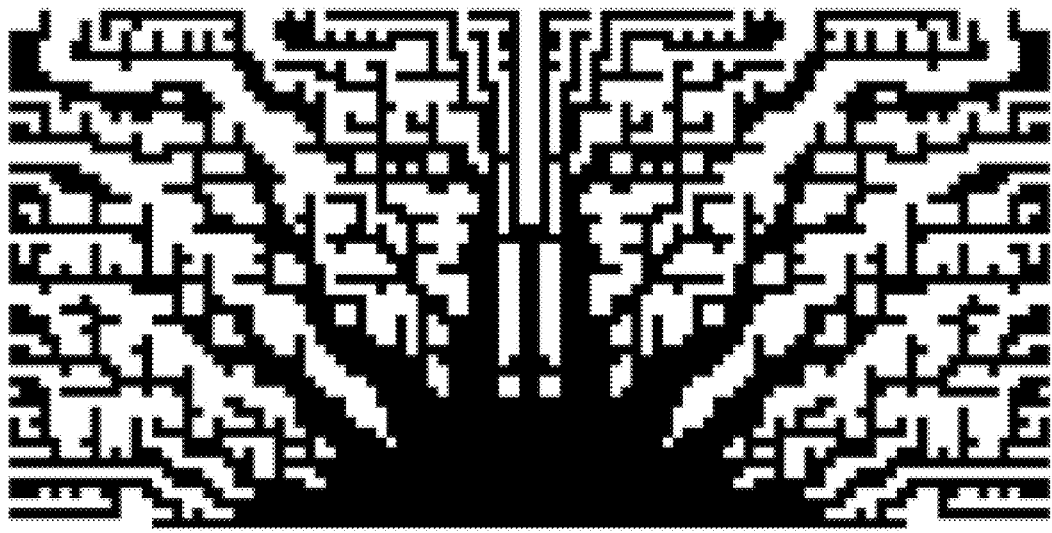
FIG. 9 illustrates a result of a third growth stage that uses the structure shown in FIG. 8 as a starting point.
Figure 10:
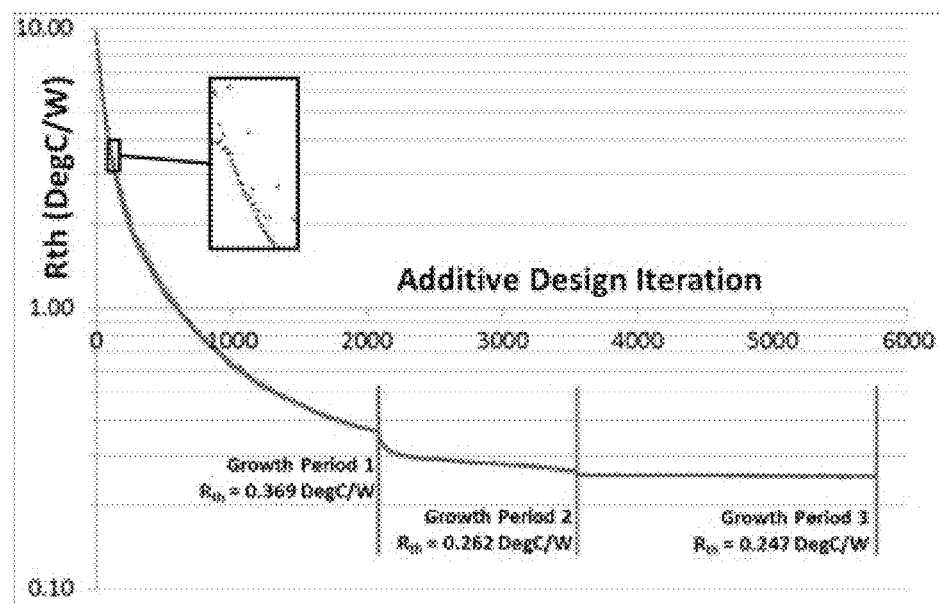
FIG. 10 illustrates the history of the overall changes in thermal resistance throughout the additive design process (FIGS. 7-9).
Figure 11:
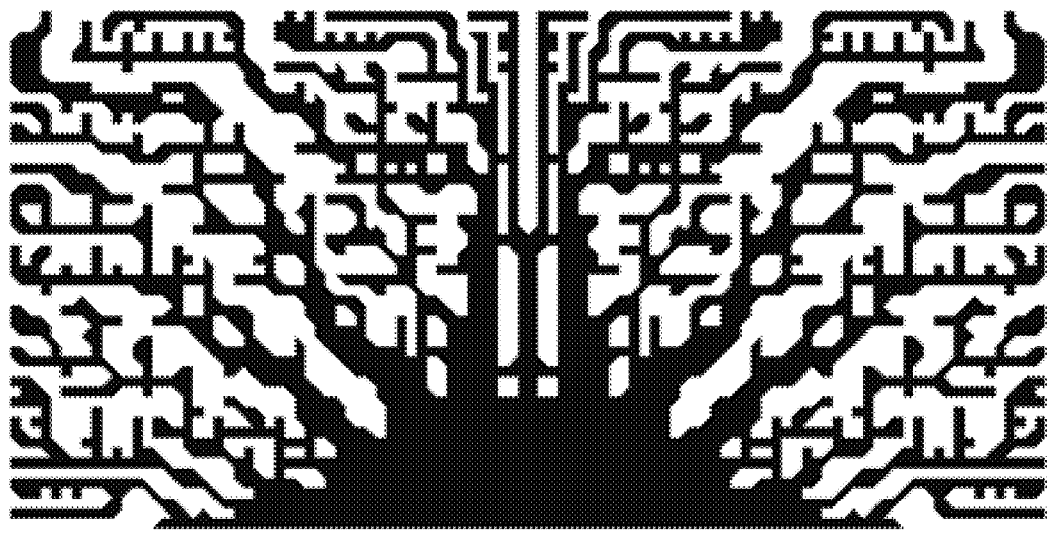
FIG. 11 illustrates an example of the smoothing result of the final structure shown in FIG. 9.

FIG. 8 illustrates a result of a second growth stage that uses the structure shown in FIG. 7 as a starting point. Note the thickening of the base trunk and further extensions of the branches to form the canopy and sides. The third growth stage, of which the result is shown in FIG. 9, further improves the thermal performance. The history of the overall changes in thermal resistance throughout the additive design process is shown in FIG. 10. FIG. 11 illustrates an example of the smoothing result of the final structure shown in FIG. 9.

Figure 12:
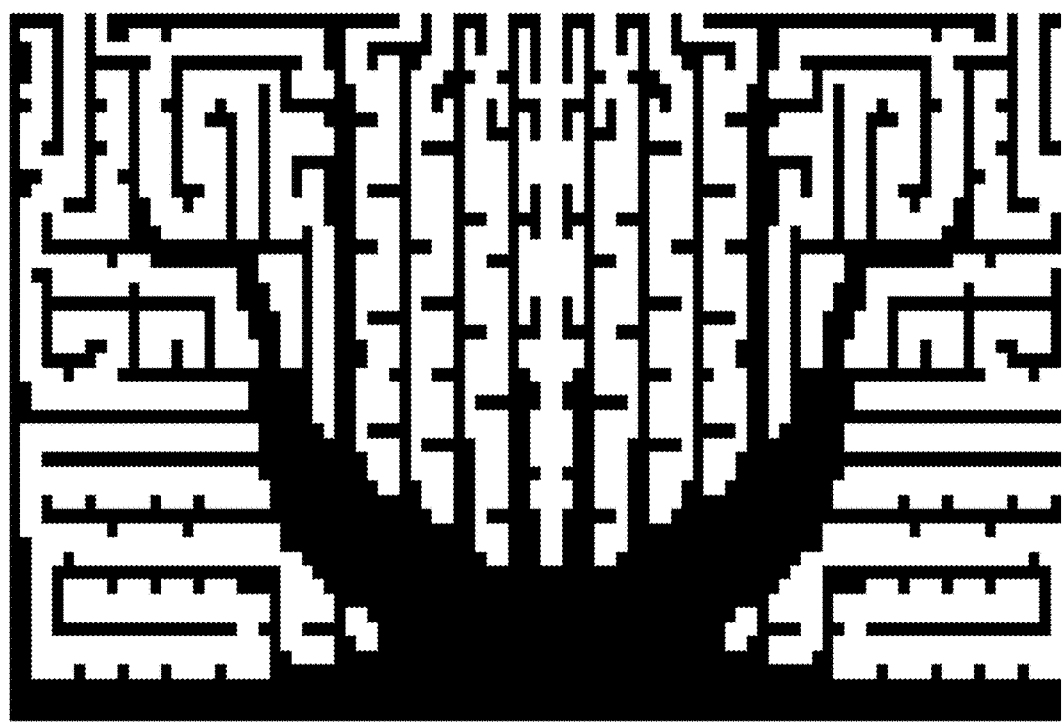
FIG. 12 illustrates an image of a heat sink grown using the thermal bottleneck parameter to determine where to incrementally add the object.

To obtain FIGS. 5-11, being a location of highest surface temperature is employed as the criterion for determining the location for adding the object. FIG. 12 illustrates an image of a heat sink grown using the thermal bottleneck parameter to determine where to incrementally add the object.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic or mechanical computer-aided engineering (CAE) design processes, it should be appreciated that various examples of the disclosed technology may be implemented using any desired combination of electronic or mechanical design processes.

What is claimed is:

1. A method, executed by at least one processor of a computer, comprising:
   A: determining, using the computer, a location on a heat sink base based on a simulation of a structure in a cooling environment and a predetermined criterion, the structure comprising the heat sink base and a heat source;
   B: adding, using the computer, an object to the location to form a new structure;
   C: simulating, using the computer, the new structure to determine thermal performance of the new structure; and
   D: repeating, using the computer, operations B and C until a predetermined condition regarding design space is met, wherein the repeating comprises:
   if the thermal performance of the new structure meets a predetermined condition regarding thermal performance, replacing, using the computer, the location with a new location determined for the new structure based on the simulating and the predetermined criterion for operation B; and
   if the thermal performance of the new structure does not meet the predetermined condition regarding thermal performance, removing, using the computer, the added object, designating the location as a location not eligible for the adding, and replacing, using the computer, the location with a new location for the structure selected from locations eligible for the adding based on the predetermined criterion for operation B.

2. The method recited in claim 1, further comprising: smoothing edges of the new structure derived after the predetermined condition regarding design space is met.

3. The method recited in claim 1, further comprising: changing the locations not eligible for the adding to locations eligible for the adding; and
   repeating operations A, B, C and D by using the new structure derived after the predetermined condition regarding design space is met as the heat sink base.

4. The method recited in claim 1, wherein the predetermined criterion is being a location having a highest fluid apparent surface temperature value.

5. The method recited in claim 1, wherein the predetermined criterion is being a location having a highest bottleneck heat transfer characteristic value or a highest shortcut heat transfer characteristic value.

6. The method recited in claim 1, wherein the thermal performance is represented by thermal resistance and the predetermined condition regarding thermal performance is improvement in thermal resistance is above a percentage value.

7. The method recited in claim 1, wherein the predetermined condition regarding design space is there is no location eligible for the adding left in the design space.

8. One or more non-transitory computer-readable media storing computer-executable instructions which when executed on one or more processors perform a method, the method comprising:
   A: determining a location on a heat sink base based on a simulation of a structure in a cooling environment and a predetermined criterion, the structure comprising the heat sink base and a heat source;
   B: adding an object to the location to form a new structure;
   C: simulating the new structure to determine thermal performance of the new structure; and
   D: repeating operations B and C until a predetermined condition regarding design space is met, wherein the repeating comprises:
   if the thermal performance of the new structure meets a predetermined condition regarding thermal performance, replacing the location with a new location determined for the new structure based on the simulating and the predetermined criterion for operation B; and
   if the thermal performance of the new structure does not meet the predetermined condition regarding thermal performance, removing the added object, designating the location as a location not eligible for the adding, and replacing the location with a new location for the structure selected from locations eligible for the adding based on the predetermined criterion for operation B.

9. The one or more non-transitory computer-readable media recited in claim 8, wherein the method further comprises:
   smoothing edges of the new structure derived after the predetermined condition regarding design space is met.

10. The one or more non-transitory computer-readable media recited in claim 8, wherein the method further comprises:
    changing the locations not eligible for the adding to locations eligible for the adding; and repeating operations A, B, C and D by using the new structure derived after the predetermined condition regarding design space is met as the heat sink base.

11. The one or more non-transitory computer-readable media recited in claim 8, wherein the predetermined criterion is being a location having a highest fluid apparent surface temperature value.

12. The one or more non-transitory computer-readable media recited in claim 8, wherein the predetermined criterion is being a location having a highest bottleneck heat transfer characteristic value or a highest shortcut heat transfer characteristic value.

13. The one or more non-transitory computer-readable media recited in claim 8, wherein the thermal performance is represented by thermal resistance and the predetermined condition regarding thermal performance is improvement in thermal resistance is above a percentage value.

14. The one or more non-transitory computer-readable media recited in claim 8, wherein the predetermined condition regarding design space is there is no location eligible for the adding left in the design space.

15. A system, comprising:
   one or more processors, the one or more processors programmed to perform a method, the method comprising:
   A: determining a location on a heat sink base based on a simulation of a structure in a cooling environment and a predetermined criterion, the structure comprising the heat sink base and a heat source;
   B: adding an object to the location to form a new structure;
   C: simulating the new structure to determine thermal performance of the new structure; and
   D: repeating operations B and C until a predetermined condition regarding design space is met, wherein the repeating comprises:
      if the thermal performance of the new structure meets a predetermined condition regarding thermal performance, replacing the location with a new location determined for the new structure based on the simulating and the predetermined criterion for operation B; and
      if the thermal performance of the new structure does not meet the predetermined condition regarding thermal performance, removing the added object, designating the location as a location not eligible for the adding, and replacing the location with a new location for the structure selected from locations eligible for the adding based on the predetermined criterion for operation B.

16. The system recited in claim 15, wherein the method further comprises:
   smoothing edges of the new structure derived after the predetermined condition regarding design space is met.

17. The system recited in claim 15, wherein the method further comprises:
   changing the locations not eligible for the adding to locations eligible for the adding; and
   repeating operations A, B, C and D by using the new structure derived after the predetermined condition regarding design space is met as the heat sink base.

18. The system recited in claim 15, wherein the predetermined criterion is being a location having a highest fluid apparent surface temperature value.

19. The system recited in claim 15, wherein the predetermined criterion is being a location having a highest bottleneck heat transfer characteristic value or a highest shortcut heat transfer characteristic value.

20. The system recited in claim 15, wherein the thermal performance is represented by thermal resistance and the predetermined condition regarding thermal performance is improvement in thermal resistance is above a percentage value.

* * * * *